United States Patent
Nishio et al.

(10) Patent No.: US 9,732,230 B2
(45) Date of Patent: Aug. 15, 2017

(54) COMPOSITE OXIDE BLACK PIGMENT AND METHOD FOR PRODUCING SAME

(71) Applicant: DAINICHISEIKA COLOR & CHEMICALS MFG. CO., LTD., Tokyo (JP)

(72) Inventors: Akira Nishio, Tokyo (JP); Toru Kawakami, Tokyo (JP); Kenichi Yamane, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 226 days.

(21) Appl. No.: 14/386,259

(22) PCT Filed: Mar. 29, 2013

(86) PCT No.: PCT/JP2013/059627
§ 371 (c)(1),
(2) Date: Sep. 18, 2014

(87) PCT Pub. No.: WO2013/150983
PCT Pub. Date: Oct. 10, 2013

(65) Prior Publication Data
US 2015/0048286 A1 Feb. 19, 2015

(30) Foreign Application Priority Data
Apr. 2, 2012 (JP) .................. 2012-084288

(51) Int. Cl.
*C09C 1/24* (2006.01)
*C01G 49/00* (2006.01)
*C09C 1/62* (2006.01)

(52) U.S. Cl.
CPC .............. *C09C 1/24* (2013.01); *C01G 49/009* (2013.01); *C01G 49/0072* (2013.01); *C09C 1/62* (2013.01); *C01P 2002/84* (2013.01); *C01P 2006/12* (2013.01); *C01P 2006/60* (2013.01); *C01P 2006/62* (2013.01); *C01P 2006/63* (2013.01); *C01P 2006/64* (2013.01)

(58) Field of Classification Search
CPC ..................................................... C09C 1/24

USPC ......................................................... 252/586
See application file for complete search history.

(56) References Cited

FOREIGN PATENT DOCUMENTS

| JP | 2000-265133 | 9/2000 |
|---|---|---|
| JP | 2001-099497 | 4/2001 |
| JP | 3212065 B | 9/2001 |
| JP | 2002-020119 | 1/2002 |
| JP | 2002020119 | * 1/2002 |
| JP | 2002-309123 | 10/2002 |
| JP | 2002309123 | * 10/2002 |
| JP | 3347934 B | 11/2002 |
| JP | 2004-069931 | 3/2004 |
| JP | 2004-204175 | 7/2004 |
| JP | 2007-230848 | 9/2007 |
| JP | 2009-190952 | 8/2009 |
| JP | 4348872 B | 10/2009 |
| JP | 2012051113 | 3/2012 |

OTHER PUBLICATIONS

Japanese Office Action, Sep. 1, 2015, Japanese Patent Application No. 2014509137.
Supplementary European Search Report, issued in the corresponding European patent application No. 13772340.9, dated Nov. 19, 2015, 8 pages.

* cited by examiner

*Primary Examiner* — Monique Peets
(74) *Attorney, Agent, or Firm* — Hamre, Schumann, Mueller & Larson, P.C.

(57) ABSTRACT

A composite oxide black pigment has characteristics to absorb visible rays and near infrared rays, and is composed of an oxide of main constituent metals including copper, manganese and iron. In a wavelength region of 400 to 1,000 nm, the composite oxide black pigment has a minimum wavelength, at which a transmittance becomes minimum, in a wavelength region of 600 to 800 nm, a molar ratio of manganese/iron is 3/1 to 30/1, and a molar ratio of copper/(manganese+iron) is 1/2 to 1.2/2. Its sole use makes it possible to obtain a transparent vivid bluish, neutral gray color, and also to maximize an absorption in a near infrared region. It is, therefore, excellent in near infrared absorption characteristics.

11 Claims, 5 Drawing Sheets

[Fig. 1]
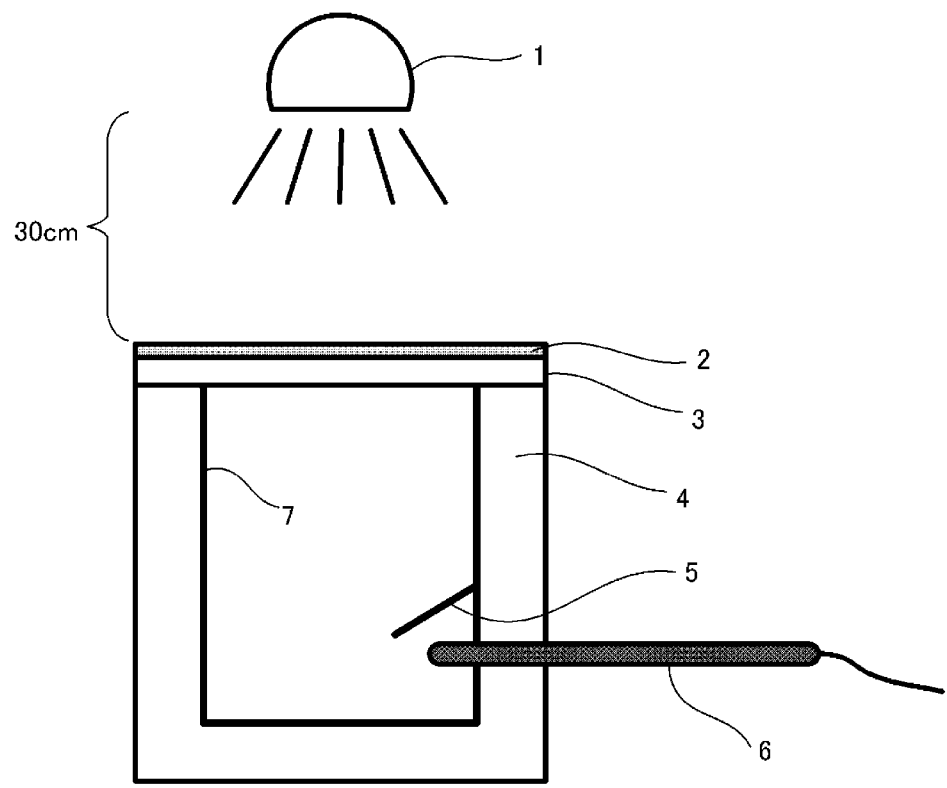

[Fig. 2]
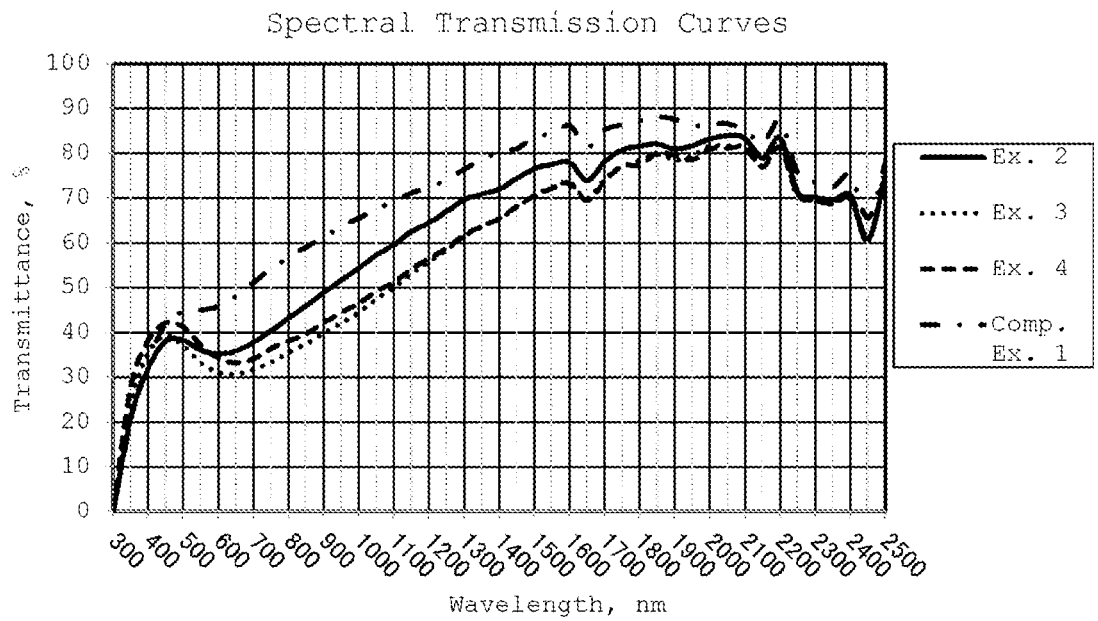
[Fig. 3]
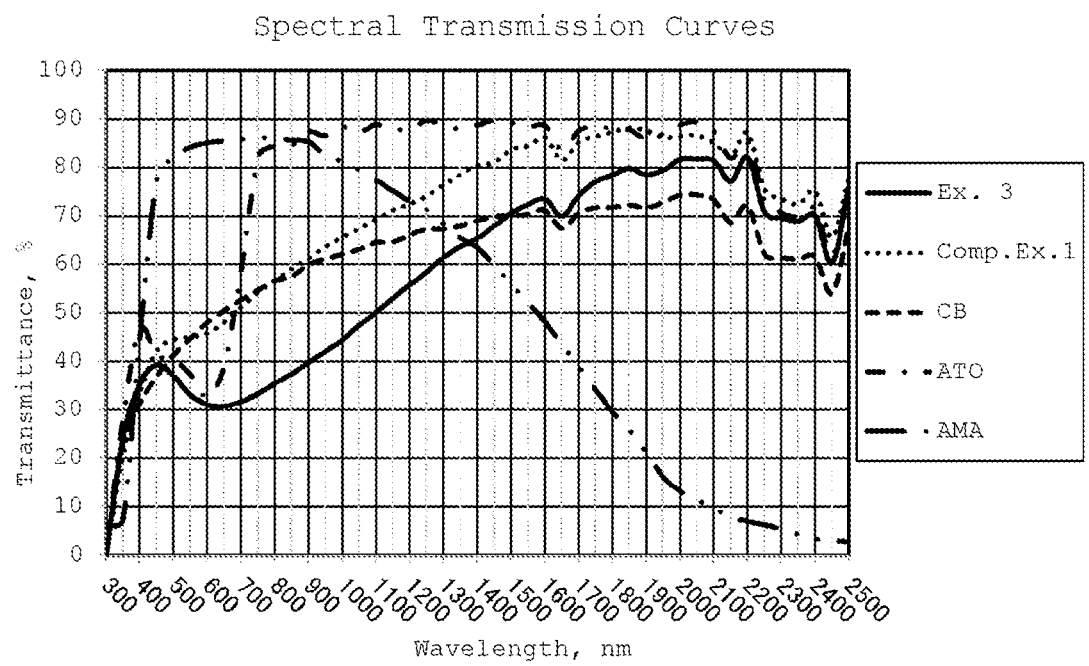

[Fig. 4]
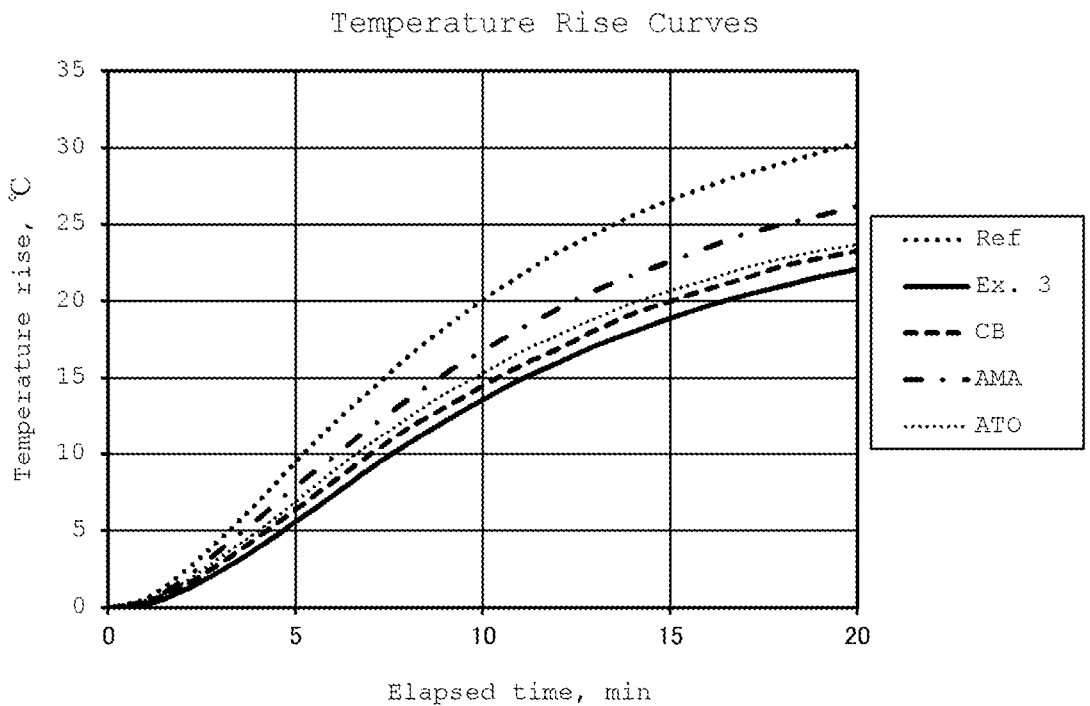
[Fig. 5]
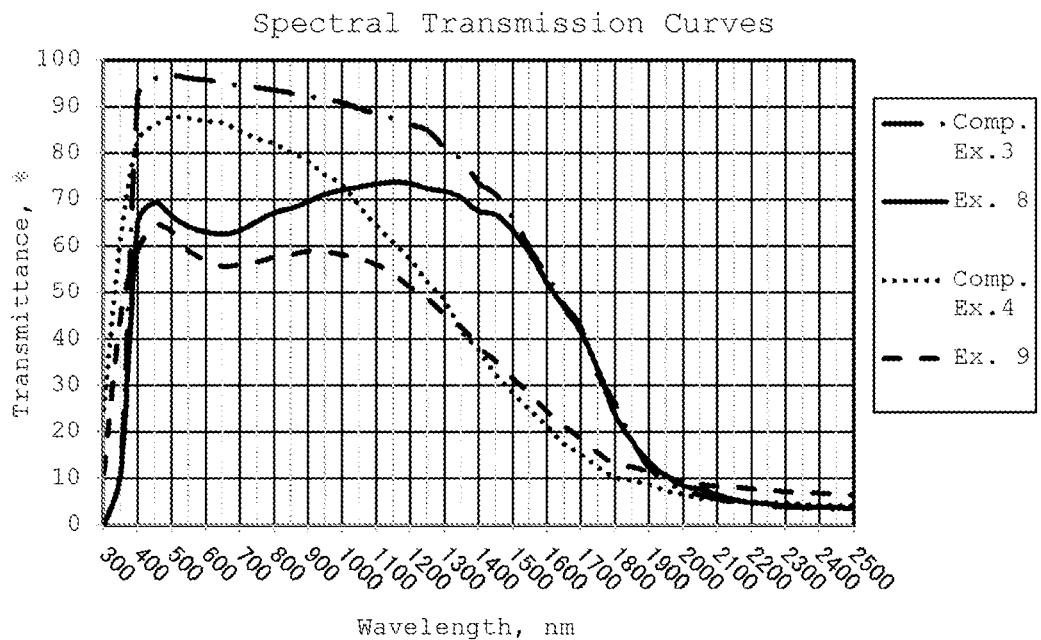

[Fig. 6]
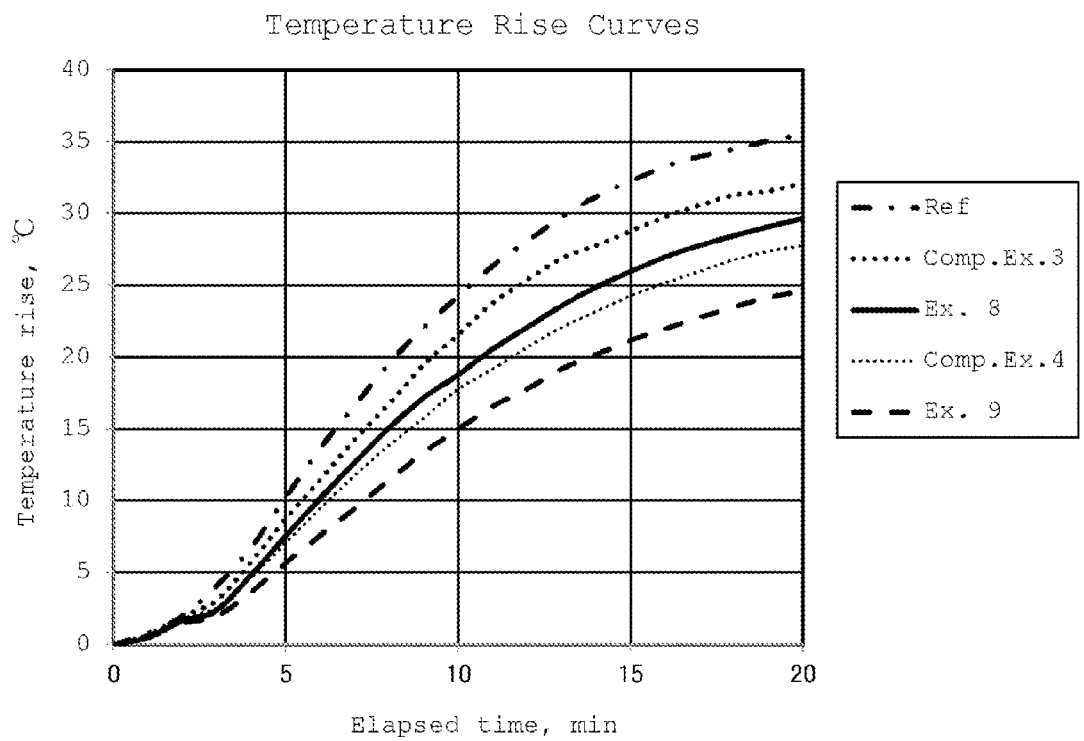
[Fig. 7]
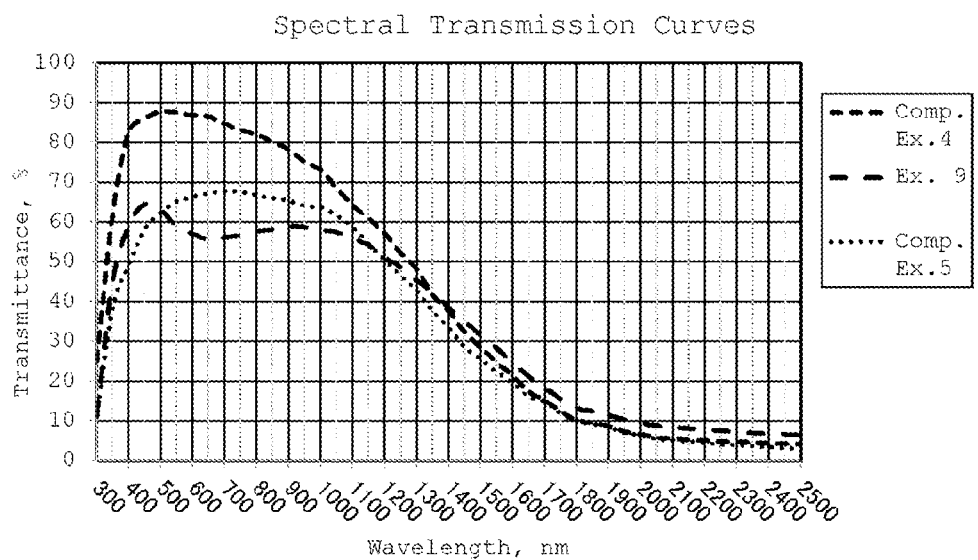

[Fig. 8]
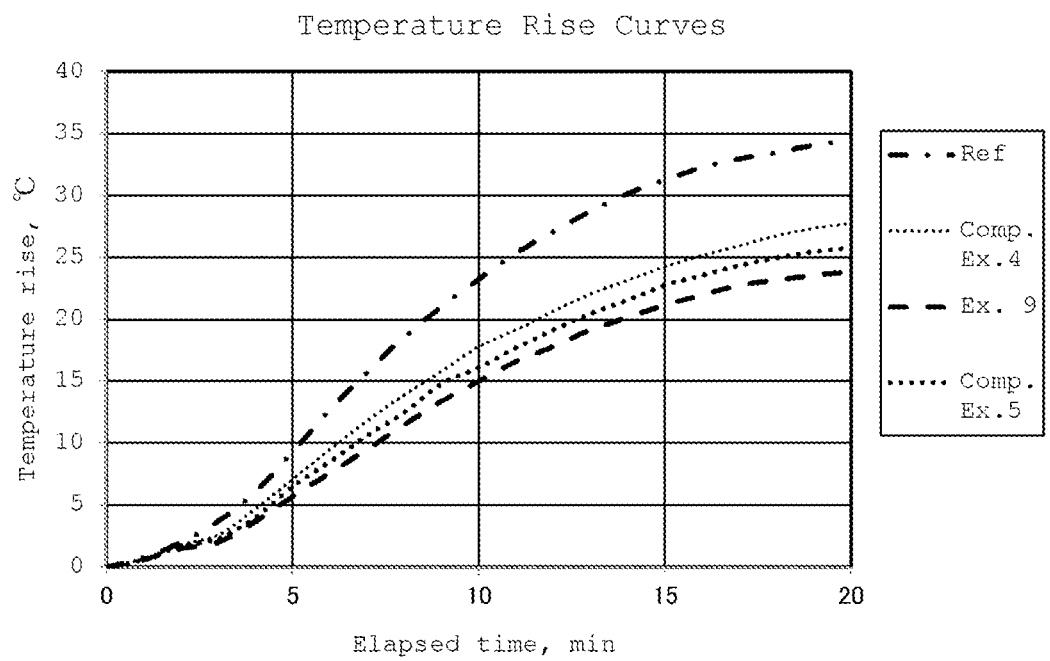
[Fig. 9]
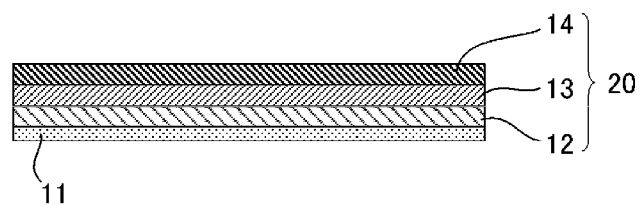

COMPOSITE OXIDE BLACK PIGMENT AND METHOD FOR PRODUCING SAME

TECHNICAL FIELD

This invention relates to a composite oxide black pigment having a neutral gray hue and excellent absorption characteristics in a near infrared region, to an article, infrared ray shielding composition and synthetic leather, all available from the use of the composite oxide black pigment, and also to a process for producing the composite oxide black pigment.

BACKGROUND ART

From the viewpoint of global environment protection and energy saving, active research has been being carried out in recent years on materials that can reflect or shield infrared rays (infrared ray cut-off materials). Applications of infrared ray cut-off materials to the windows of houses, buildings, vehicles and the like have been studied in attempts to suppress temperature rises in rooms and vehicles by shielding rays in the infrared region out of incoming light.

In such infrared ray cut-off materials, known as colorless and transparent ones are tin-doped indium oxide (ITO), antimony-doped tin oxide (ATO) and the like. These materials are transparent without absorbing rays in the visible region, but absorb rays in the infrared region. These materials, however, involve a problem in that the absorption property in the infrared region is insufficient unless the addition amount, coat weight or film thickness is increased. Moreover, there is another problem in that the absorption of rays in the near infrared region is not very strong. In addition, there is a resource-related restriction because of the use of a rare metal or metals, such as indium (In) and tin (Sn), as a constituent or constituents.

Given the tinting of windowpanes, vehicle windows or the like, on the other hand, it is common to tint them black from the viewpoint of suppressing temperature rises, and carbon black is used in general. Carbon black is black when applied as a deep color, but presents a yellowish dull or brown hue when applied in the form of a thin film. For adjusting this color hue, bluish tinting or the like is additionally applied to carbon black before use. As organic black pigments, on the other hand, there are perylene black, azomethineazo-based black, and the like. These organic black pigments, however, allow rays in the infrared region to transmit without absorption. Moreover, such organic black pigments are known to be inferior in light resistance to inorganic pigments.

It is also known to tint the windowpanes of houses and buildings and the windows of vehicles, for example, by coating a fine particulate pigment directly on glass or films or applying adhesive layers, which have been tinted with the fine particulate pigment, to glass or films while making use of the transparency that is one of the characteristics of the fine particulate pigment. Especially, to tint liquid crystal displays (LCD), plasma display panels (PDP), organic EL panels and the like, preferred is a transparent vivid bluish, neutral gray color that is different from black or bluishness available when tinted in deep color.

As mentioned above, carbon black which is most frequently used, however, presents a yellowish dull or brown hue when applied in the form of a thin film. Carbon black is, therefore, not considered to be one that presents a transparent vivid bluish, neutral gray color. Perylene black presents a reddish purple hue when applied in the form of a thin film, and therefore, is not considered to be one that presents a transparent vivid bluish, neutral gray color. Azomethineazo-based black is equipped with a preferred color hue, but does not absorb rays in the infrared region. It is also a current situation that even among inorganic pigments, practically no material is found to be excellent in light transmission properties, to present a transparent vivid bluish, neutral gray color, and also to be excellent in the absorption performance of infrared rays.

For a pigment that is to be used as described above, light resistance is required. Expectations are, therefore, growing for inorganic pigments which are excellent in light resistance compared with organic pigments. Known examples include copper(Cu)-manganese(Mn)-iron(Fe)-based, composite oxide black pigments, which are prepared by a wet process, have high tinting power, and have bluish hues (Patent Documents 1 to 3). Also known are composite oxides, which present black colors and have an absorption property in a wavelength region ranging from the visible region to the infrared region (Patent Documents 4 to 6). It is also known to use carbon black in optical films for displays with a view to imparting a neutral gray tone (Patent Documents 7 and 8).

PRIOR ART DOCUMENTS

Patent Documents

Patent Document 1: JP-B-3212065
Patent Document 2: JP-A-2002-309123
Patent Document 3: JP-B-3347934
Patent Document 4: JP-B-4348872
Patent Document 5: JP-A-2001-99497
Patent Document 6: JP-A-2007-230848
Patent Document 7: JP-A-2004-69931
Patent Document 8: JP-A-2000-265133

DISCLOSURE OF THE INVENTION

Problem to be Solved by the Invention

Even with the pigments described in Patent Documents 1 to 6, it was, however, impossible to obtain a transparent vivid bluish, neutral gray color suitable for tinting LCD, PDP, organic EL panels and the like. The optical films described in Patent Documents 7 and 8 had tones adjusted to neutral gray by using, together with carbon black, tinting pigments other than carbon black. Accordingly, these optical films were not those which can obtain an intended, transparent vivid bluish, neutral gray color by using a single pigment. Further, neither the evaluation of an absorption property in a wavelength region of 800 to 1,500 nm nor a study about a method for maximizing an absorption in the wavelength region was made in any of these patent documents.

The present invention has been made in view of such problems of the conventional technologies as described above, and its objects are to provide a composition oxide black pigment, which can obtain a transparent vivid bluish, neutral gray color by its sole use, can maximize an absorption in the near infrared region and is excellent in absorption property in the near infrared region, and also a process for producing the same. Further objects of the present invention are to provide an article, infrared ray shielding composition and synthetic leather, all of which are imparted with a transparent vivid bluish, neutral gray color and are excellent in absorption property in the near infrared region.

Means for Solving the Problem

Described specifically, the below-described composite oxide black pigments are provided according to the present invention.

[1] A composite oxide black pigment having characteristics to absorb visible rays and near infrared rays and composed of an oxide of main constituent metals comprising copper, manganese and iron, wherein in a wavelength region of 400 to 1,000 nm, the composite oxide black pigment has a minimum wavelength, at which a transmittance becomes minimum, in a wave length region of 600 to 800 nm, and a molar ratio of manganese/iron is 3/1 to 30/1, and a molar ratio of copper/(manganese+iron) is 1/2 to 1.2/2.

[2] The composite oxide black pigment as described above in [1], which has a spinel structure represented by a composition of Cu (Mn, Fe)$_2$O$_4$ and has a BET specific surface area of at least 30 m$^2$/g.

[3] The composite oxide black pigment as described above in [1] or [2], wherein at least one divalent metal of calcium and magnesium has been incorporated in a proportion of 2 to 10 mol % relative to the copper.

[4] The composite oxide black pigment as described above in any one of [1]-[3], which has a BET specific surface area of at least 40 m$^2$/g.

According to the present invention, the below-described articles are also provided.

[5] An article having a bluish, neutral gray color, comprising a transparent base material and the composite oxide black pigment as described above in any one of [1]-[4] as placed in a dispersed state at least one of on a surface and in an interior of the transparent base material.

[6] The article as described above in [5], which has an "a" coordinate of −4 to 0 and a "b" coordinate of −8 to 0 in the CIE LAB(L*a*b*) colorimetric system.

According to the present invention, the below-described infrared ray shielding compositions coating formulations are also provided.

[7] An infrared ray shielding composition comprising a re sin material and the composite oxide black pigment as described above in any one of [1]-[4].

[8] The infrared ray shielding composition as described above in [7], further comprising at least one infrared ray shielding material selected from the group consisting of tin-doped indium oxide, antimony-doped tin oxide and conductive zinc oxide.

[9] The infrared ray shielding composition as described above in [7] or [8], which is a coating formulation or an adhesive.

According to the present invention, the below-described synthetic leather is also provided.

[10] A synthetic leather provided with a skin layer comprising the coating formulation as described above in any one of [7]-[9].

According to the present invention, the below-described production processes of the composite oxide black pigments are also provided.

[11] A process for producing the composite oxide black pigment as described above in any one of [1]-[4], comprising the following steps: adding an alkali agent to a mixed aqueous solution of metal salts, which comprise the main constituent metals, to form a coprecipitate, and concurrently with or after the formation of the coprecipitate, oxidizing the coprecipitate with an oxidizing agent to form a pigment precursor, and baking the resulting pigment precursor, followed by grinding processing.

[12] The process as described above in [11], wherein the coprecipitate is formed by controlling a pH at 11 to 13.5.

Advantageous Effects of the Invention

The composite oxide black pigment according to the present invention can obtain a transparent vivid bluish, neutral gray color by its sole use, and is excellent in absorption property in the near infrared region. The use of the composite oxide black pigment according to the present invention can, therefore, obtain an article, which is imparted with a previously-unavailable, transparent vivid bluish, neutral gray color, is excellent in absorption property in the near infrared region and is imparted with a temperature rise suppressing effect.

BRIEF DESCRIPTION OF THE DRAWINGS

FIG. 1 is a schematic view illustrating an outline of a testing equipment employed in a confirmation test of temperature rise suppressing effect.

FIG. 2 is a graph showing the measurement results of spectral transmittances of the composite oxide black pigments (measurement samples) obtained in Examples 2 to 4 and Comparative Example 1.

FIG. 3 is a graph showing the measurement results of spectral transmittances of the composite oxide black pigments (measurement samples) obtained in Example 3 and Comparative Example 1 and CB, AMA and ATO (measurement samples).

FIG. 4 is temperature rise curves representing the results of a confirmation test of temperature rise suppressing effect (1).

FIG. 5 is a graph showing the measurement results of spectral transmittances of the composite oxide black pigments (measurement samples) obtained in Examples 8 and 9 and Comparative Examples 3 and 4.

FIG. 6 is temperature rise curves representing the results of a confirmation test of temperature rise suppressing effect (2).

FIG. 7 is a graph showing the measurement results of spectral transmittances of the composite oxide black pigments (measurement samples) obtained in Example 9 and Comparative Examples 4 and 5.

FIG. 8 is temperature rise curves representing the results of a confirmation test of temperature rise suppressing effect (3).

FIG. 9 is a schematic view depicting an embodiment of the synthetic leather according to the present invention.

MODES FOR CARRYING OUT THE INVENTION

Citing certain preferred embodiments as examples, a description will hereinafter be made about the details of the composite oxide black pigment according to the present invention. The composite oxide black pigment according to the present invention has characteristics to absorb visible rays and near infrared rays, and is composed of an oxide of main constituent metals that comprise copper, manganese and iron. When the transmittance is measured in a wavelength region ranging from visible rays to infrared rays, especially in the wavelength region of 400 to 1,000 nm, the composite oxide black pigment has a minimum wavelength, at which the transmittance becomes minimum, in the wavelength region of 600 to 800 nm. In the wavelength region of 400 to 1,000 nm, the composite oxide black pigment preferably has a minimum wavelength, at which the transmittance becomes minimum, in a wavelength region of 400 to 500 nm. As the composite oxide black pigment according to the present invention has such optical characteristics, a transparent vivid bluish, neutral gray color can be obtained by its sole use. Further, the composite oxide black pigment according to the present invention is soft and is excellent in dispersibility although it is extremely fine particles. Furthermore, it is excellent in safety and also has a high value of utility, because the intended transparent vivid bluish, neutral gray color can be obtained without the inclusion of an element such as chromium (Cr).

It is to be noted that the transmittance of the composite oxide black pigment according to the present invention in a predetermined wavelength region can be confirmed by measuring its transmittance in a wavelength region of 300 to 2,500 nm, for example, with a spectrophotometer ("U-4100", trade name; manufactured by Hitachi, Ltd.). Compared with carbon black widely used as a black pigment, the composite oxide black pigment according to the present invention is low in transmittance in a wavelength region of visible rays to infrared rays, that is, 500 to 1,500 nm, and exhibits still stronger absorption property in this wavelength region.

The present inventors also found that among composite oxides, black pigments having spinel structures formed of oxides of main constituent metals, which comprise copper, manganese and iron, are useful. In particular, it was found that in a Cu—Mn—Fe-based composite oxide black pigment having a spinel structure represented by a composition of $Cu(Mn, Fe)_2O_4$, the absorption characteristics in the near infrared region can be pronouncedly improved by adjusting its composition (molar ratio) of manganese(Mn)/iron(Fe). The absorption property in the near infrared region increases, for example, when the Cu—Mn—Fe-based composite oxide black pigment is adjusted to have a composition that the molar ratio of manganese/iron is large (high manganese/low iron). However, with a composition that the molar ratio of manganese/iron is excessively large, the absorption property in the near infrared region does not increase, and moreover, the tinting power tends to lower. To achieve effective shielding of infrared rays while maintaining tinting power, the molar ratio of manganese/iron is adjusted to 3/1 to 30/1, preferably 4/1 to 10/1. By adjusting the molar ratio of manganese/iron to the above-described range, it is possible to lower the transmittance in a near infrared region (800 to 1,500 nm) and also to obtain a more vivid bluish color.

When the molar ratio of manganese/iron is smaller than 3/1 (the proportion of iron becomes greater), the color hue becomes yellowish and a transmission curve close to that of carbon black is obtained. Accordingly, high absorption property can no longer be obtained in the near infrared region. When the molar ratio of manganese/iron exceeds 30/1 (the proportion of iron becomes smaller), on the other hand, the bluishness of the hue does not become strong, and moreover, the tinting power lowers. A yellowish hue has a tendency of making it difficult to absorb rays in the near infrared region. As the bluishness of a hue increases, on the other hand, the absorption property in the near infrared region tends to increase. The composite oxide black pigment according to the present invention, therefore, exhibits dual effects of presenting a vivid bluish hue and having excellent absorption property for rays in the near infrared region.

Further, by an increase or decrease in the content of copper, the resulting composite oxide black pigment varies in tinting power and particle size. It is, therefore, preferred to adequately control the content of copper. Described specifically, the composite oxide black pigment according to the present invention preferably has the spinel structure represented by the composition of $Cu(Mn, Fe)_2O_4$. In addition, the molar ratio of copper/(manganese+iron) is 1/2 to 1.2/2, with 1/2 to 1.1/2 being preferred. When the molar ratio of copper/(manganese+iron) is smaller than 1/2 (the proportion of copper becomes smaller), the color hue becomes dull and the tinting power lowers. When the molar ratio of copper/(manganese+iron) exceeds 1.2/2 (the proportion of copper becomes greater), on the other hand, the pigment tends to have greater particle sizes, and therefore, a smaller BET specific surface area.

In addition, the incorporation of at least one divalent metal of calcium (Ca) and magnesium (Mg) in addition to copper, manganese and iron is extremely effective for adjusting the color tone and tinting power. By incorporating the divalent metal, it is possible to obtain a bluish, neutral gray black pigment which is more vivid than before. However, the incorporation of the divalent metal in an unduly small amount tends to lead to insufficient vividness. When the divalent metal is incorporated in an excessively large amount, on the other hand, no substantial change is observed on the color hue, and no additional effect tends to be expectable. The amount of the divalent metal to be incorporated may, therefore, be set preferably at 2 to 10 mol %, more preferably at 4 to 8 mol % in terms of proportion relative to copper. It is to be noted that these divalent metals can be used either singly or as a combination of two.

The BET specific surface area of the composite oxide black pigment according to the present invention may preferably be at least 30 $m^2/g$, with at least 40 $m^2/g$ being more preferred. A BET specific surface area of at least 30 $m^2/g$ can make the haze lower to 10% or less. Further, one having a BET specific surface area of at least 40 $m^2/g$ can give a haze of 3% or less, and therefore, is a better pigment of still higher transparency. It is to be noted that the BET specific surface area of the composite oxide black pigment can be measured by a BET specific surface area measuring apparatus ("NOVA-2000", trade name; manufactured by Quantachrome Instruments) according to a nitrogen adsorption method based on Japanese Industrial Standards (JIS) Z8830-1990.

The use of the composite oxide black pigment according to the present invention can produce an article having a bluish neutral gray color. Such an article can be readily obtained by placing the composite oxide black pigment in a dispersed state at least one of on a surface and in an interior of a transparent base material according to a method known to date. Specific examples of the transparent base material include plates, bottles, films and the like made of glass, acrylic resins, PET, polyvinyl butyral, polyurethanes, polyethylene, polypropylene, polycarbonates, polyimides, acrylic silicone resins, fluorinated resins, or the like. It is also preferred to use such a transparent base material in combination with a conventionally-known transparent material to an extent not impairing the advantageous effects of the present invention. For example, in order to supplement an effect unavailable from colorless and transparent ITO (tin-doped indium oxide) or ATO (antimony-doped tin oxide), the composite oxide black pigment according to the present invention may preferably be used in combination as a transparent, infrared cut-off material.

As a method for expressing a color tone, there is the CIE L*a*b* colorimetric system (color space) that was developed by International Commission of Illumination (CIE) and expresses a visible color as a color space. In this CIE L*a*b* colorimetric system, a color is expressed by three coordinates, and lightness, red (magenta) to green and yellow to blue correspond to "L*", "a*" (positive is magenta, negative is greenishness), and "b*" (positive is yellowishness, negative is bluishness), respectively. As the tone of neutral gray, one in which the "a" coordinate and the "b" coordinate are both close to 0 is expressed as an ideal. The use of the composite oxide black pigment according to the present invention can produce an article, for example, in which the "a" coordinate is −4 to 0, preferably −2 to 0 and the "b" coordinate is −8 to 0, preferably −8 to −3. The composite oxide black pigment according to the present invention can provide an article of the above-described color tone by its sole use, and therefore, has significant advantages in quality stability and production and material costs and has a high potential of effective utilization.

The composite oxide black pigment according to the present invention is excellent in dispersibility although it is fine particles. The composite oxide black pigment according to the present invention is, therefore, useful as a material for tinting resins (resin-tinting agent). Although no particular limitation is imposed on the resins to be tinted, examples include polyvinyl chloride, polycarbonates, fluorinated resins, silicone resins, polyurethane-based resins, polyphenylene sulfide, polyethylene, polypropylene, polyvinyl butyral resin, polyimide-based resins, rosin ester-based resins, acrylic resins, cellulose-based resins, and the like. After the composite oxide black pigment is added, for example, in approx. 0.2 parts by mass to 100 parts by mass of such a resin, the resin is kneaded by using rolls and is then formed into one of various shapes, such as a sheet. Therefore, the resulting tinted resin practically contains no beads of biased pigment concentrations, and a formed product of the uniformly-tinted resin can be obtained.

The use of the composite oxide black pigment according to the present invention can obtain an infrared ray shielding composition. Therefore, the infrared ray shielding composition according to the present invention contains a resin material and the above-mentioned composite oxide black pigment. As mentioned above, the composite oxide black pigment according to the present invention can obtain a transparent vivid bluish, neutral gray color, and is also excellent in absorption characteristics in the near infrared region. The use of the infrared ray shielding composition according to the present invention, which contains the composite oxide black pigment, as a coating formulation or adhesive can produce a coating film, adhesive film or the like that is imparted with a transparent vivid bluish, neutral gray color, is excellent in absorption characteristics in the near infrared region and is imparted with a temperature rise suppressing effect, and also an article having such a coating film or adhesive film or the like.

Examples of the resin material include polyurethane-based resins, acrylic resins, silicone resins, fluorinated resins, alkyd-based resins, vinyl chloride-vinyl acetate copolymers, alkoxysilane-based resins, phenol resins, polyvinyl butyral resins, polyimide-based resins, rosin ester-based resins, cellulose-based resins, and the like. These resin materials can be used either singly or as a combination of two or more. In the infrared ray shielding composition, one or more of various solvents such as, for example, water, water-soluble organic solvents and non-aqueous organic solvents may be contained. It is to be noted that the infrared ray shielding composition may be either a water-based composition or a solvent-based composition.

Preferably, the infrared ray shielding composition may further contain an infrared ray shielding material. The combined incorporation of the infrared ray shielding material and the above-mentioned composite oxide black pigment can produce a coating film, adhesive film or the like, which is still further improved in temperature increase suppressing effect, and an article having such a coating film or adhesive film or the like. As the infrared ray shielding material, one known to date can be used. Especially, the use of an infrared ray shielding material, which is high in whiteness and excellent in transparency, can still further improve the temperature rise suppressing effect without impairing the transparent vivid bluish, neutral gray color of the composite oxide black pigment. Specific examples of such an infrared ray shielding material include tin-doped indium oxide (ITO), antimony-doped tin oxide (ATO), conductive zinc oxide, and the like. These infrared ray shielding materials can be used either singly or as a combination of two or more.

Infrared ray shielding materials such as ITO, ATO and conductive zinc oxide are substantially colorless but are tinted slightly yellowish. It is to be noted that for displays, a hue of neutral gray is required to avoid any impairment to the balance of R (red), G (green) and B (blue). Black organic pigments have no absorption in the infrared region. On the other hand, carbon black (CB) leads to a slightly-yellowish hue. Therefore, these black organic pigments and CB are not considered to be preferable as black tinting pigments for displays. It is to be noted that CB include those tinged bluish. However, CB tinged bluish as mentioned above have relatively large particle sizes, have no neutral gray hue, and are also inferior in transparency. In contrast, the composite oxide black pigment according to the present invention can obtain a preferred color hue without impairing the absorption in the infrared region, and can also make the absorption still greater in the near infrared region.

A colorless infrared ray shielding material has a property to absorb no visible rays and to absorb infrared rays, but does not absorb much rays in a near infrared region up to around 1,500 nm. Practically, no organic pigments are found to have an absorption in the infrared region. On the other hand, the composite oxide black pigment according to the present invention has a substantial absorption in the near infrared region. By combining the composite oxide black pigment according to the present invention with a colorless infrared ray shielding material which does not absorb much rays in the near infrared region, it is, therefore, possible to supplement their absorption wavelength regions each other and to absorb rays in a broader infrared region.

The use of the above-described infrared ray shielding composition can produce a synthetic leather. The synthetic leather according to the present invention is, therefore, provided with a skin layer formed from the above-mentioned infrared ray shielding composition. The synthetic leather according to the present invention uses, as a coating formulation, the infrared ray shielding composition with the composite oxide black pigment contained therein, and has the skin layer formed from the coating formulation. Accordingly, the synthetic leather according to the present invention presents a transparent vivid bluish, neural gray color, is excellent in absorption characteristics in the near infrared region, and is imparted with a temperature rise suppressing effect. The synthetic leather according to the present invention is hence useful, for example, as an interior material or the like for vehicles. About the synthetic leather according to the present invention, a description will hereinafter be made while describing one example of its production process.

FIG. 9 is a schematic view depicting an embodiment of the synthetic leather according to the present invention. To obtain the synthetic leather 20 of this embodiment, the above-mentioned infrared ray shielding composition as a coating formulation is first applied onto a surface of a release paper sheet 11 to give an appropriate film thickness so that a coating film is formed. No particular limitation is imposed on the kind of the resin material contained in the coating formulation but, for example, a polycarbonate-based, non-yellowing polyurethane resin or the like can be suitably used. By drying the thus-formed coating film while heating it as needed, a skin layer 12 can be formed on one side of the release paper sheet 11.

After an adhesive is applied onto a surface of the skin layer 12 to give an appropriate film thickness, drying is conducted while heating as needed, whereby an adhesive layer 13 can be formed on the surface of the skin layer 12. In the adhesive, components such as a solvent, e.g., toluene, methyl ethyl ketone or dimethylformamide and a crosslinking agent are generally contained in addition to the resin. No particular limitation is imposed on the kind of the resin for use in the adhesive but, for example, one of the same kind as the resin material contained in the coating formulation is preferred. After the thus-formed adhesive layer 13 is placed on a surface of a base material such as a woven fabric to provide a stacked structure, pressing and heating are conducted as needed. By peeling off the release paper sheet 11 next, the synthetic leather 20 of this embodiment can be obtained.

It is to be noted that the use of an adhesive with a white pigment added therein can also form the adhesive layer 13 in a white state with light reflectivity imparted thereto. Therefore, it is also possible to produce a synthetic leather having a double structure that is provided with a skin layer, which exhibits a temperature rise suppressing effect, and an adhesive layer, which exhibits light reflectivity. A synthetic leather having such a double structure is useful especially as an interior material for a vehicle such as an automotive vehicle.

A description will next be made about the process of the present invention for the production of the composite oxide black pigment. Considering that, when a Cu—Mn—Fe oxide-based black pigment which presents bluishness is synthesized by the wet precipitation process, a still stronger bluish composite oxide black pigment can be obtained by preventing trivalent ions from penetrating to the four-coordinated sites (hereinafter referred to as "the A sites") in a spinel structure upon formation of the spinel structure through a solid state reaction during baking, the present inventors conducted a further study. As a result, it was found that, by setting the copper in a stoichiometric amount or slightly excessive among the main constituent metals in the Cu—Mn—Fe oxide-based black pigment and then adding a divalent metal which selectively coordinates to the A sites in the spinel structure, the penetration of trivalent ions to the A sites in the spinel structure can be inhibited and a composite oxide black pigment having a transparent vivid bluish, neutral gray hue can be obtained. The present inventors also found that, by precipitating, with an alkali agent, the salts of the main constituent metals (copper, manganese, and iron), which make up the composite oxide black pigment, and the salt of a divalent metal (Ca and/or Mg), which is used as needed, together as the hydroxides of these metals and subjecting the resulting precipitate to oxidation treatment in a liquid phase concurrently with the precipitation or after the precipitation, the subsequent baking temperature can be set extremely low.

The process of the present invention for the production of the composite oxide black pigment comprises the following steps: (1) adding an alkali agent to a mixed aqueous solution of metal salts, which comprise the main constituent metals, to form a coprecipitate, and concurrently with or after the formation of the coprecipitate, oxidizing the coprecipitate with an oxidizing agent to form a pigment precursor, and (2) baking the resulting pigment precursor, followed by grinding processing. A description will hereinafter be made about the process of the present invention for the production of the composite oxide black pigment.

In the step (1), the metal salts which contain the main constituent metals are dissolved to prepare the mixed aqueous solution. As the metal salts, it is possible to use salts, which are useful in the production of conventional composite oxide black pigments, such as sulfates, nitrates, chlorides, acetates or the like. The total concentration of the metal salts in the mixed aqueous solution may suitably be set at approx. 5 to 50 mass %. This mixed aqueous solution is concurrently dropped, for example, together with an aqueous solution of an alkali such as caustic soda as a precipitating agent into a precipitation medium provided beforehand. The concentration of the reaction system as calculated in terms of the metal salts may be set at any level unless it gives any particularly deleterious effect to the precipitation product (coprecipitate). Taking the workability and the subsequent steps into consideration, the total concentration may preferably be set at 0.05 to 0.2 mole/liter. A total concentration lower than 0.05 mole/liter tends to make the dried product very hard and to reduce the yield. A total concentration higher than 0.2 mole/liter, on the other hand, may make the resulting synthesis product non-uniform.

The temperature (synthesis temperature) at which the coprecipitate is formed may be set at a usual temperature in the wet process. Described specifically, it is preferred to form (synthesize) the coprecipitate at 0 to 100° C. However, as the synthesis temperature becomes higher, the resulting particles grow faster and tend to become greater in particle size. Therefore, the resultant composite oxide black pigment tends to be impaired in tinting power, and moreover, its aggregation becomes stronger so that its dispersibility may be deleteriously affected. It is, therefore, preferred to set the synthesis temperature at 30° C. or lower.

Upon forming the coprecipitate by excessively adding the aqueous solution of the alkali agent as a precipitating agent to the mixed aqueous solution of the metal salts, it is preferred to control the pH, at which the coprecipitate is formed, a little higher compared with the cases of synthesis of general black pigments in view of the use in applications that make use of the transparency of the resulting composite oxide black pigment. Described specifically, it is preferred to control the pH to a range of 11 to 13.5 upon formation of the coprecipitate. Upon formation of the coprecipitate, higher pH facilitates to obtain the pigment with smaller particle sizes. When the pH exceeds 13.5, however, the dried product becomes very hard and also tends to aggregate firmly. The pigment may hence be provided with inferior dispersibility. When the pH is lower than 11 upon formation of the coprecipitate, the resulting composite oxide black pigment tends to have greater particle sizes.

Preferably, the excess portion of the alkali agent may be added after the formation of the coprecipitate. The excess amount of the alkali agent may be set preferably at 1.1 to 1.5 times, more preferably around 1.1 times the molar number of the alkali agent required for the coprecipitation (precipitation). After the coprecipitate is formed with stirring over 30 minutes to 1 hour as described above, aging is conducted for 5 to 20 minutes or so to complete the coprecipitation (precipitation) reaction.

In the present invention, the formed coprecipitate is subjected to oxidation treatment with the oxidizing agent to convert divalent metal ions to trivalent metal ions. The oxidation treatment may be conducted in the coprecipitation system concurrently with the formation of the coprecipitate, or may be conducted in the coprecipitation system or in another liquid phase after completion of the coprecipitation reaction. Whichever the case may be, the aging of the coprecipitate after the oxidation treatment is preferred, because the coprecipitate is improved in uniformity and is increased in purity. Unless the coprecipitate is aged, the color developing properties may be impaired by occluded impurities. The aging of the coprecipitate makes it possible to provide the resulting composite oxide black pigment with still better color developing properties, still finer particle sizes and excellent dispersibility.

Specific examples of the oxidizing agent include known oxidizing agents such as hydrogen peroxide, sodium chlorate, ammonium sulfite, and air (oxygen). When the coprecipitate is formed under high pH conditions, however, the use of an oxidizing agent such as sodium chlorate renders the coprecipitate to aggregate firmly so that the dispersibility of the resulting composite oxide black pigment may be lowered. It is, therefore, preferred to use hydrogen peroxide or air (oxygen) as an oxidizing agent, because the composite oxide black pigment can be obtained in a softer and well-dispersible form. It is to be noted that the amount of the oxidizing agent to be used can be an amount needed for the oxidization of divalent metal ions to triavalent metal ions. No particular limitation is imposed on the temperature upon aging the coprecipitate, and it may be 50 to 90° C. Subsequent to being aged for around 1 hour, filtration and water washing are conducted. Then, by conducting drying at a temperature of 100 to 150° C., a pigment precursor can be obtained as a dry product of the coprecipitate.

In the step (2), the thus-obtained pigment precursor is subjected to grinding processing subsequent to baking. As a result, the target composite oxide black pigment can be obtained. The baking temperature may be set generally at 500 to 700° C., preferably 550 to 600° C., and the baking may preferably be conducted under an oxidizing atmosphere. Further, the baking time may be set in a range of 30 minutes to 1 hour. By grinding after the baking, the composite oxide black pigment can be obtained with a desired BET specific surface area. The grinding processing can be conducted following a method known to date, and can be a dry method, wet method, or a combined dry and wet method. Upon conducting the grinding processing, it is possible to use, for example, an attritor, ball mill, oscillating mill, jet mill, bead mill, spray dryer or the like.

Based on an analysis of the composite oxide black pigment of the present invention obtained as described above, for example, by powder X-ray diffraction, it can be confirmed to be a single compound having a spinel structure and containing no dissimilar phase. By an X-ray fluorescence analysis, it is also possible to confirm that one or two divalent metals have been incorporated in the composite oxide black pigment.

EXAMPLES

The present invention will hereinafter be described more specifically based on examples. It should be borne in mind that the designations of "parts" and "%" in the following description are on a mass basis unless otherwise specifically indicated.

Example 1

Water was added to copper sulfate (120 parts), manganese sulfate (130 parts) and ferric sulfate (53.4 parts) to completely dissolve them so that an aqueous solution of the mixed salts (1,000 parts) was prepared. Further, water was added to caustic soda (120 parts) to completely dissolve it so that an aqueous solution of caustic soda (1,000 parts) was prepared. To water (1,600 parts) as a precipitation medium, the aqueous solution of the mixed salts and aqueous solution of caustic soda, both prepared as described above, were added dropwise at the same time, and a precipitation reaction was brought to completion over 1 hour. The pH of the reaction mixture was adjusted to a range of 12.0 to 13.0. After completion of the dropwise addition of the aqueous solution of the mixed salts, the excess aqueous solution of caustic soda was continuously added dropwise. Subsequent to the completion of the dropwise addition, a solution of aqueous hydrogen peroxide (concentration of hydrogen peroxide: 35%; 60 parts) diluted in water (120 parts) was added drop wise to conduct oxidation treatment.

After completion of the oxidation treatment, the temperature of the reaction mixture was raised to 80° C., at which aging was conducted for 1 hour. After the reaction mixture was thoroughly washed with water to wash away any remaining salts, filtration was conducted. The reaction product so collected was dried at 100 to 140° C. to obtain a dried product. The resultant dried product was baked at 580° C. for 1 hour to obtain a baked product. The resultant baked product was ground to obtain a composite oxide black pigment (Example 1) of 51.2 $m^2/g$ BET specific surface area. Further, a powder X-ray diffraction analysis was performed on the resultant composite oxide black pigment, and the composite oxide black pigment was confirmed to be a single compound having a spinel structure and containing no dissimilar phase. The composition (molar ratio) of the metals that make up the resultant composite oxide black pigment is shown in Table 1.

The resultant composite oxide black pigment and a melamine alkyd resin were placed in a paint shaker (manufactured by Red Devil, Inc.) with the pigment content being set at 3 PHR (PHR=(pigment (g)/resin (g))×100), and the composite oxide black pigment was thoroughly dispersed to obtain a coating formulation. The coating formulation so obtained was applied onto a PET film by a #6 bar coater. After drying, baking was conducted under conditions of 120° C. and 20 minutes to obtain a measurement sample. The thickness of a coating film formed on the thus-obtained measurement sample was 3 to 4 µm.

Using a spectrophotometer ("U-4100", trade name; manufactured by Hitachi, Ltd.), the measurement sample was measured for transmittance in a wavelength region of 300 to 2,500 nm. As a result, in a wavelength region of 400 to 1,000 nm, the measurement sample was confirmed to have a maximum wavelength, at which the transmittance became maximum, in a wavelength region of 400 to 500 nm and also a minimum wavelength, at which the transmittance became minimum, in a wavelength region of 600 to 800 nm. The transmittances at wavelengths of 500 nm, 800 nm and 1,500 nm are shown in Table 2. It is understood that the measurement sample had a transmittance of approx. 40 to 50% in the visible region and transmitted light had a neutral gray hue. In addition, the transmittance was the smallest at a minimum wavelength around a wavelength of 700 nm in the visible region, the transmittance then increased gradually, and the absorption in the near infrared region was significant.

Using a 6-mil applicator, the above-described coating formulation was also applied onto a sheet of white art paper. After drying, baking was conducted at 120° C. for 20 minutes to obtain a measurement sample. The thickness of a coating film formed on the thus-obtained measurement sample was 23 μm. Using the spectrophotometer ("U-400", trade name; manufactured by Hitachi, Ltd.), the measurement sample was measured for transmittance in the wavelength range of 300 to 2,500 nm. As a result, it was confirmed that the measurement sample had a reflectance of 2% or lower in a wavelength region of 300 to 1,500 nm and had absorption characteristics in the ultraviolet, visible and near infrared regions.

Example 2

A composite oxide black pigment (Example 2) of 54.8 $m^2/g$ BET specific surface area was obtained in a similar manner as in Example 1 except that copper sulfate (120 parts), manganese sulfate (130 parts) and ferric sulfate (53.4 parts) were used and calcium chloride (3.6 parts) was dissolved in a precipitation medium (water). Further, a powder X-ray diffraction analysis was performed on the resultant composite oxide black pigment, and the composite oxide black pigment was confirmed to be a single compound having a spinel structure and containing no dissimilar phase. The composition (molar ratio) of the metals that make up the resultant composite oxide black pigment is shown in Table 1. In a similar manner as in Example 1, a coating formulation and measurement sample were also prepared. The measurement sample so prepared was measured for transmittance in a similar manner as in Example 1. As a result, as in Example 1, the measurement sample was confirmed to have a maximum wavelength, at which the transmittance became maximum, in the wavelength region of 400 to 500 nm and also a minimum wavelength, at which the transmittance became minimum, in the wavelength region of 600 to 800 nm. The transmittances at the wavelengths of 500 nm, 800 nm and 1,500 nm are shown in Table 2.

Example 3

A composite oxide black pigment (Example 3) of 47.5 $m^2/g$ BET specific surface area was obtained in a similar manner as in Example 2 except that copper sulfate (120 parts), manganese sulfate (144.4 parts) and ferric sulfate (29.7 parts) were used. Further, a powder X-ray diffraction analysis was performed on the resultant composite oxide black pigment, and the composite oxide black pigment was confirmed to be a single compound having a spinel structure and containing no dissimilar phase. The composition (molar ratio) of the metals that make up the resultant composite oxide black pigment is shown in Table 1. In a similar manner as in Example 1, a coating formulation and measurement sample were also prepared. The measurement sample so prepared was measured for transmittance in a similar manner as in Example 1. As a result, the measurement sample was confirmed to have maximum and minimum wavelength regions as in the above-described examples. The transmittances at the wavelengths of 500 nm, 800 nm and 1,500 nm are shown in Table 2. Compared with the measurement sample obtained in Example 2, this measurement sample was still stronger in bluishness, and was lower in transmittance in the near infrared region.

Example 4

A composite oxide black pigment (Example 4) of 43.3 $m^2/g$ BET specific surface area was obtained in a similar manner as in Example 2 except that copper sulfate (120 parts), manganese sulfate (152.1 parts) and ferric sulfate (16.7 parts) were used. Further, a powder X-ray diffraction analysis was performed on the resultant composite oxide black pigment, and the composite oxide black pigment was confirmed to be a single compound having a spinel structure and containing no dissimilar phase. The composition (molar ratio) of the metals that make up the resultant composite oxide black pigment is shown in Table 1. In a similar manner as in Example 1, a coating formulation and measurement sample were also prepared. The measurement sample so prepared was measured for transmittance in a similar manner as in Example 1. As a result, as in Example 1, the measurement sample was confirmed to have a maximum wavelength, at which the transmittance became maximum, in the wavelength region of 400 to 500 nm and also a minimum wavelength, at which the transmittance became minimum, in the wavelength region of 600 to 800 nm. The transmittances at the wavelengths of 500 nm, 800 nm and 1,500 nm are shown in Table 2. Compared with the measurement sample obtained in Example 2, this measurement sample was still stronger in bluishness, and was lower in transmittance in the near infrared region.

Example 5

A composite oxide black pigment (Example 5) of 49.2 $m^2/g$ BET specific surface area was obtained in a similar manner as in Example 2 except that copper sulfate (120 parts), manganese sulfate (144.4 parts) and ferric sulfate (29.7 parts) were used and magnesium chloride (5.0 parts) was dissolved together with calcium chloride in a precipitation medium (water). Further, a powder X-ray diffraction analysis was performed on the resultant composite oxide black pigment, and the composite oxide black pigment was confirmed to be a single compound having a spinel structure and containing no dissimilar phase. The composition (molar ratio) of the metals that make up the resultant composite oxide black pigment is shown in Table 1. In a similar manner as in Example 1, a coating formulation and measurement sample were also prepared. The measurement sample so prepared was measured for transmittance in a similar manner as in Example 1. As a result, as in Example 1, the measurement sample was confirmed to have a maximum wavelength, at which the transmittance became maximum, in the wavelength region of 400 to 500 nm and also a minimum wavelength, at which the transmittance became minimum, in the wavelength region of 600 to 800 nm. The transmittances at the wavelengths of 500 nm, 800 nm and 1,500 nm are shown in Table 2. Compared with the measurement sample obtained in Example 2, this measurement sample was still stronger in bluishness, and was lower in transmittance in the near infrared region.

Example 6

A composite oxide black pigment (Example 6) of 40.6 $m^2/g$ BET specific surface area was obtained in a similar manner as in Example 2 except that copper sulfate (120 parts), manganese sulfate (157 parts) and ferric sulfate (8.6 parts) were used. Further, a powder X-ray diffraction analysis was performed on the resultant composite oxide black pigment, and the composite oxide black pigment was confirmed to be a single compound having a spinel structure and containing no dissimilar phase. The composition (molar ratio) of the metals that make up the resultant composite oxide black pigment is shown in Table 1. In a similar manner as in Example 1, a coating formulation and measurement sample were also prepared. The measurement sample so prepared was measured for transmittance in a similar manner as in Example 1. As a result, as in Example 1, the measurement sample was confirmed to have a maximum wavelength, at which the transmittance became maximum, in the wavelength region of 400 to 500 nm and also a minimum wavelength, at which the transmittance became minimum, in the wavelength region of 600 to 800 nm. The transmittances at the wavelengths of 500 nm, 800 nm and 1,500 nm are shown in Table 2. This s measurement sample was similar in color hue to that of Example 4, but was slightly dull and was decreased in tinting power.

Example 7

A composite oxide black pigment (Example 6) of 50.6 m²/g BET specific surface area was obtained in a similar manner as in Example 2 except that copper sulfate (132 parts), manganese sulfate (144.4 parts) and ferric sulfate (29.7 parts) were used. Further, a powder X-ray diffraction analysis was performed on the resultant composite oxide black pigment, and the composite oxide black pigment was confirmed to be a single compound having a spinel structure and containing no dissimilar phase. The composition (molar ratio) of the metals that make up the resultant composite oxide black pigment is shown in Table 1. In a similar manner as in Example 1, a coating formulation and measurement sample were also prepared. The measurement sample so prepared was measured for transmittance in a similar manner as in Example 1. As a result, as in Example 1, the measurement sample was confirmed to have a maximum wavelength, at which the transmittance became maximum, in the wavelength region of 400 to 500 nm and also a minimum wavelength, at which the transmittance became minimum, in the wavelength region of 600 to 800 nm. The transmittances at the wavelengths of 500 nm, 800 nm and 1,500 nm are shown in Table 2. This s measurement sample was similar in color hue to that of Example 3, but was strong in bluishness and was low in transmittance in the near infrared region. Comparative Example 1

A composite oxide black pigment (Comparative Example 1) of 47.3 m²/g BET specific surface area was obtained in a similar manner as in Example 2 except that copper sulfate (120 parts), manganese sulfate (121.7 parts) and ferric sulfate (66.7 parts) were used. Further, a powder X-ray diffraction analysis was performed on the resultant composite oxide black pigment, and the composite oxide black pigment was confirmed to be a single compound having a spinel structure and containing no dissimilar phase. The composition (molar ratio) of the metals that make up the resultant composite oxide black pigment is shown in Table 1. In a similar manner as in Example 1, a coating formulation and measurement sample were al so prepared. The measurement sample so prepared was measured for transmittance in a similar manner as in Example 1. As a result, the measurement sample was confirmed to have no minimum wavelength, at which the transmittance would otherwise have become minimum, in the wavelength region of 600 to 800 nm. The transmittances at the wavelengths of 500 nm, 800 nm and 1,500 nm are shown in Table 2. This measurement sample was yellowish dull in hue, and compared with those of the examples, was high as a whole in transmittance in the near infrared region and was inferior in shielding properties for infrared rays.

Comparative Example 2

A composite oxide black pigment (Comparative Example 2) of 49.5 m²/g BET specific surface area was obtained in a similar manner as in Example 1 except that copper sulfate (108 parts), manganese sulfate (144.4 parts) and ferric sulfate (29.7 parts) were used. Further, a powder X-ray diffraction analysis was performed on the resultant composite oxide black pigment, and the composite oxide black pigment was confirmed to be a single compound having a spinel structure and containing no dissimilar phase. The composition (molar ratio) of the metals that make up the resultant composite oxide black pigment is shown in Table 1. In a similar manner as in Example 1, a coating formulation and measurement sample were al so prepared. The measurement sample so prepared was measured for transmittance in a similar manner as in Example 1. As a result, the measurement sample was confirmed to have no minimum wavelength, at which the transmittance would otherwise have become minimum, in the wavelength region of 600 to 800 nm. The transmittances at the wavelengths of 500 nm, 800 nm and 1,500 nm are shown in Table 2. Compared with the measurement samples of the examples, this measurement sample was dull in hue, had no bluishness, and was inferior in tinting power. Compared with the measurement samples of the examples, this measurement sample was high as a whole in transmittance in the near infrared region, and was inferior in shielding properties for infrared rays.

TABLE 1

|  | Cu/(Mn + Fe) (molar ratio) | Mn/Fe (molar ratio) | Ca/Cu (molar ratio) | Mg/Cu (molar ratio) | BET specific surface area (m²/g) |
|---|---|---|---|---|---|
| Ex. 1 | 1.0/2 | 4.0/1 | — | — | 51.2 |
| Ex. 2 | 1.0/2 | 4.0/1 | 0.05/1 | — | 54.8 |
| Ex. 3 | 1.0/2 | 8.0/1 | 0.05/1 | — | 47.5 |
| Ex. 4 | 1.0/2 | 15.0/1 | 0.05/1 | — | 43.3 |
| Ex. 5 | 1.0/2 | 8.0/1 | 0.03/1 | 0.05/1 | 49.2 |
| Ex. 6 | 1.0/2 | 30.0/1 | 0.05/1 | — | 40.6 |
| Ex. 7 | 1.1/2 | 8.0/1 | 0.05/1 | — | 50.6 |
| Comp. Ex. 1 | 1.0/2 | 2.5/1 | 0.05/1 | — | 47.3 |
| Comp. Ex. 2 | 0.9/2 | 8.0/1 | 0.05/1 | — | 49.5 |

TABLE 2

|  |  | Transmittance (%) | | |
|---|---|---|---|---|
|  | Hue | 500 nm | 800 nm | 1,500 nm |
| Ex. 1 | Slightly bluish | 40.2 | 44.5 | 77.8 |
| Ex. 2 | Slightly bluish | 38.3 | 43.3 | 76.6 |
| Ex. 3 | Bluish | 37.1 | 35.6 | 70.6 |
| Ex. 4 | Bluish | 41.3 | 38.2 | 70.5 |
| Ex. 5 | Vivid bluish | 38.5 | 35.3 | 69.5 |
| Ex. 6 | Light bluish | 49.3 | 45.2 | 78.3 |
| Ex. 7 | Bluish | 36.5 | 35.1 | 69.8 |
| Comp. Ex. 1 | Yellowish | 44.6 | 56.8 | 83.7 |
| Comp. Ex. 2 | Dull bluish | 52.3 | 47.2 | 81.4 |

Measurement of Spectral Transmittance (1)

A graph that shows the measurement results of spectral transmittances of the composite oxide black pigments (measurement samples) obtained in Examples 2 to 4 and Comparative Example 1 is given in FIG. 2. It is understood from the results shown in FIG. 2 that the composite oxide black pigments of Examples 2 to 4 are different in transmission curve in the near infrared region although their transmission curves are substantially the same in the visible region. As shown in Table 2, it is evident that with a high iron composition (Comparative Example 1), the hue becomes yellowish and the transmittance becomes high in the near infrared region.

Comparison with other Black Pigments

As other black pigments, carbon black (CB) and azomethineazo black (AMA) were provided. Also provided was antimony-doped tin oxide (ATO), which is generally used as a transparent infrared ray shielding material. Using these CB, AMA and ATO, coating formulations were prepared in a similar manner as in Example 1. Further, measurement samples were prepared and were measured for transmittance in a similar manner as in Example 1. It is to be noted that the coating formulations were prepared by setting CB at 1 PHR, AMA at 2.5 PHR and ATO at 20 PHR, respectively.

A graph showing the measurement results of spectral transmittances of the composite oxide black pigments (measurement samples) obtained in Example 3 and Comparative Example 1 and CB, AMA and ATO (measurement samples) is given in FIG. 3. From the results shown in FIG. 3, it is evident that the composite oxide black pigment of Example 3 is lower in transmittance in a wavelength region of about 1,500 nm and shorter than the other materials and is very good in absorption characteristics in the near infrared region. It is also apparent that ATO is not improved in absorption property in the near infrared region unless the pigment content is increased to 20 PHR or so while the composite oxide black pigment of Example 3 is high in absorption property in the near infrared region even in an addition amount of 3 PHR or so. CB can increase an absorption property in the near infrared region in an addition amount smaller than the composite oxide black pigment of Example 3. It is, however, understood that any attempt to bring the absorption property in the visible region to an intended transmittance leads to a high transmittance in the near infrared region. The results of measurements of the "L" coordinates, "a" coordinates and "b" coordinates in the CIE LAB(L*a*b*) colorimetric system are shown in Table 3.

TABLE 3

|  | L* | a* | b* |
|---|---|---|---|
| Ex. 3 | 70.8 | −1.2 | −7.02 |
| Comp. Ex. 1 | 75.1 | −0.75 | 1.32 |
| Carbon black | 75.3 | 0.96 | 8.69 |
| AMA | 68.5 | 2.05 | −5.83 |

Confirmation Test of Temperature Rise Suppressing Effect (1)

Employing the equipment illustrated in FIG. 1, a confirmation test of temperature rise suppressing effect was performed. The equipment illustrated in FIG. 1 is provided with a case 4 made of foamed polystyrene and having a black colored paper sheet 7 bonded to an inner wall surface thereof, a thermocouple 6 inserted from a bore formed in a lower part of the case, a glass plate 3 arranged over an opening of the case 4 to prevent ambient air from flowing into the case 4, a standard light source lamp 1 arranged above the glass plate 3, and a shade 5 for avoiding direct exposure of the thermocouple 6 to light irradiated from the standard light source lamp 1. A measurement sample 2 is placed on the glass plate 3, and the standard light source lamp 1 was set at a height of 30 cm from the measurement sample 2. While irradiating light from the standard light source lamp 1, the temperature inside the case 4 was measured over time to draw a temperature rise curve. Used as such measurement samples 2 were a non-coated PET film (Ref), the measurement sample obtained in Example 3, and the measurement samples prepared using CB, AMA and ATO. The drawn temperature rise curves are shown in FIG. 4.

The existence of close correlations is observed between the temperature rise curves shown in FIG. 4 and the spectral transmission curves shown in FIG. 3. For example, AMA having no absorption in the infrared region is smallest in temperature rise suppressing effect, and its temperature rise suppressing effect after 20 minutes was approx. 4° C. when compared with the reference. CB exhibits a spectral transmission curve that the transmittance gradually increases from the visible region to the infrared region, and ATO exhibits a spectral transmission curve that the absorption is little in the visible region and the transmittance gradually decreases in the infrared region. The temperature rise suppressing effects of CB and ATO after 20 minutes were approx. 6 to 7° C. when compared with the reference. In the case of Example 3, on the other hand, the temperature rise suppressing effect after 20 minutes was approx. 8° C. when compared with the reference, and the effect is understood to be the highest. The spectral transmission curve of Example 3 is low in transmittance in the near infrared region but is high in transmittance on the long wavelength side. The profile of the spectral transmission curve of Example 3 is very close to that of the spectral transmission curve of CB, but the difference in transmittance in the near infrared region is considered to be related to the difference in temperature rise suppressing effect.

From the foregoing, it is understood that the composite oxide black pigment according to the present invention has a neutral gray hue, exhibits significant absorption of near infrared rays, and as a single pigment, is equipped with both tinting power in a preferred color hue and a temperature rise suppressing effect.

Example 8

The composite oxide black pigment obtained in Example 3, conductive zinc oxide and a melamine alkyd resin were mixed such that the composite oxide black pigment amounted to 1 PHR and conductive zinc oxide amounted to 29 PHR, and were placed in a paint shaker (manufactured by Red Devil, Inc.). The composite oxide black pigment and conductive zinc oxide were thoroughly dispersed to obtain a coating formulation. The coating formulation so obtained was applied onto a PET film by a #6 bar coater. After drying, baking was conducted under conditions of 120° C. and 20 minutes to prepare a measurement sample. The thickness of a coating film formed on the thus-prepared measurement sample was 3 to 4 μm.

Example 9 and Comparative Examples 3 to 5

Coating formulations were obtained in a similar manner as in Example 8 described above except that they were proportioned as shown in Table 4. Using the thus-obtained coating formulations, measurement samples were then prepared in a similar manner as in Example 8 described above. As CB, "Raven 5000" (trade name, product of Columbian Chemicals Company, Inc.) was used.

TABLE 4

(unit: PHR)

| | ATO | Conductive zinc oxide | Composite oxide black pigment[1] | CB |
|---|---|---|---|---|
| Comp. Ex. 3 | | 30 | | |
| Ex. 8 | | 29 | 1 | |
| Comp. Ex. 4 | 30 | | | |
| Ex. 9 | 29 | | 1 | |
| Comp. Ex. 5 | 29.7 | | | 0.3 |

[1])Prepared in Example 3

Measurement of Spectral Transmittance (2)

A graph that shows the measurement results of spectral transmittances of the composite oxide black pigments (measurement samples) obtained in Examples 8 and 9 and Comparative Examples 3 and 4 is given in FIG. 5. It is understood from the results shown in FIG. 5 that conductive zinc oxide is high in transmittance and excellent in transparency in the visible region, but compared with ATO, is inferior in shielding properties in the infrared region (Comparative Examples 3 and 4). It is also understood that, when a transparent infrared light shielding material such as conductive zinc oxide or ATO and each composite oxide black pigment are combined, absorptions ascribable to the composite oxide black pigment exist in the visible region and in to an infrared region of from the visible region to 1,200 to 1,500 nm (Examples 8 and 9). It is also understood that in a region on the side of still longer wavelengths, the characteristic of the transparent infrared ray shielding material contributes considerably and the composite oxide black pigment and infrared ray shielding material function to supplement each other. Therefore, the use of the composite oxide black pigment according to the present invention can obtain a preferred hue of neutral gray, and can still increase an absorption in the near infrared region than the use of an infrared ray shielding material alone.

Confirmation Test of Temperature Rise Suppressing Effect (2)

By a similar procedure as in the above-described "Confirmation test of temperature rise suppressing effect (1)", a confirmation test of temperature rise suppressing effect was performed on the reference PET film (Ref) and the measurement samples obtained in Examples 8 and 9 and Comparative Examples 3 and 4, and temperature rise curves were drawn. The drawn temperature rise curves are shown in FIG. 6. As shown in FIGS. 5 and 6, it is evident that the measurement samples, which are low in transmittance in the infrared region, are superior in temperature rise suppressing effect. Comparing Comparative Example 3 with Example 8 and Comparative Example 4 with Example 9, respectively, they are substantially the same in transmittance on the side of wavelengths longer than 1,500 nm. However, the Examples 8 and 9, in which the composite oxide black pigments and the corresponding infrared ray shielding materials are combined, respectively, are superior in temperature rise suppressing effect compared with Comparative Examples 3 and 4. It is, therefore, understood that the differences in transmittance in a near infrared region on the side of wavelengths shorter than 1,500 nm contribute to temperature rise suppressing effect. From the foregoing, it is understood that a still better temperature rise suppressing effect can be obtained by combining the composite oxide black pigment according to the present invention with a colorless infrared ray shielding material.

Measurement of Spectral Transmittance (3)

A graph that shows the measurement results of spectral transmittances of the composite oxide black pigments (measurement samples) obtained in Example 9 and Comparative Examples 4 and 5 is given in FIG. 7. As shown in FIG. 7, it is understood that with the measurement sample of Example 9, a characteristic absorption ascribable to the composite oxide black pigment exists in the visible region to a near infrared region of up to 1,200 nm. Further, between the measurement sample of Example 9, in which the composite oxide black pigment was used, and the measurement sample of Comparative Example 5, in which CB was used, a difference was confirmed in transmittance in the near infrared region. CB presented a yellowish dull hue. On the other hand, with each composite oxide black pigment which presented a transparent vivid bluish, neural gray color, the preferred color hue was maintained even when combined with ATO.

Confirmation Test of Temperature Rise Suppressing Effect (3)

By a similar procedure as in the above-described "Confirmation test of temperature rise suppressing effect (1)", a confirmation test of temperature rise suppressing effect was performed on the reference PET film (Ref) and the measurement samples obtained in Example 9 and Comparative Examples 4 and 5, and temperature rise curves were drawn. The drawn temperature rise curves are shown in FIG. 8. As shown in FIG. 8, it is understood that compared with CB, the composite oxide black pigment is superior in temperature rise suppressing effect (Example 9 and Comparative Example 5). As the hue of CB is yellowish dull, it may be combined with another color material to adjust the hue to neutral gray. This, however, requires substantial labor. In contrast, the composite oxide black pigment is a pigment that has a neutral gray hue unavailable from CB alone. The use of the composite oxide black pigment according to the present invention can, therefore, obtain a preferred hue of neutral gray without combining it with another color material.

INDUSTRIAL APPLICABILITY

The composite oxide black pigment according to the present invention is useful as a tinting agent for films, coating materials and the like useful on window panes of buildings, ordinary houses, vehicles such as electric railcars and automotive vehicles, ships, aircraft and the like; a tinting material for jars and bottles; a tinting agent for coating materials useful on LCD, PDP, organic EL panels and solar cells; a material for producing synthetic leathers, an adhesive material, and a material for light-wavelength adjustment lenses; and the like.

LEGEND

1: Standard light source lamp
2: Measurement sample
3: Glass plate
4: Case
5: Shade
6: Thermocouple
7: Black colored paper sheet
11: Release paper sheet
12: Skin layer
13: Adhesive layer
14: Base material
20: Synthetic leather

The invention claimed is:

1. A composite oxide black pigment having characteristics to absorb visible rays and near infrared rays,
wherein the composite comprises an oxide of main constituent metals comprising copper, manganese, and iron,
within a wavelength region from 400 to 1,000 nm, the composite oxide black pigment has a minimum wavelength in a wavelength region from 600 to 800 nm, wherein the minimum wavelength is a wavelength at which a transmittance becomes minimum,
a molar ratio of manganese/iron is in a range from 3/1 to 30/1, and a molar ratio of copper/(manganese+iron) is in a range from 1/2 to 1.2/2, and
at least one divalent metal selected from the group consisting of calcium and magnesium is present in a proportion in a range from 2 to 10 mol % relative to the copper.

2. The composite oxide black pigment according to claim 1,
wherein the composite oxide black pigment has a spinel structure represented by a composition of $Cu(Mn,Fe)_2O_4$ and has a BET specific surface area of at least 30 $m^2/g$.

3. The composite oxide black pigment according to claim 1,
wherein the composite oxide black pigment has a BET specific surface area of at least 40 $m^2/g$.

4. An article having a bluish, neutral gray color, comprising:
a transparent base material; and
the composite oxide black pigment according to claim 1, wherein the composite oxide black pigment is placed in a dispersed state, at least one place selected from the group consisting of on a surface and in an interior of the transparent base material.

5. The article according to claim 4,
wherein the color exhibits an a coordinate in a range from −4 to 0 and a b coordinate in a range from −8 to 0 in the L*a*b* colorimetric system.

6. An infrared ray shielding composition comprising:
a resin material; and
the composite oxide black pigment according to claim 1.

7. The infrared ray shielding composition according to claim 6, further comprising at least one infrared ray shielding material selected from the group consisting of tin-doped indium oxide, antimony-doped tin oxide and conductive zinc oxide.

8. The infrared ray shielding composition according to claim 6, which is a coating formulation or an adhesive.

9. A synthetic leather provided with a skin layer comprising the infrared ray shielding composition according to claim 6.

10. A process for producing the composite oxide black pigment according to claim 1, comprising following steps:
adding an alkali agent to a mixed aqueous solution of metal salts, which comprise the main constituent metals, so as to form a coprecipitate;
concurrently with or after the formation of the coprecipitate, oxidizing the coprecipitate with an oxidizing agent so as to form a pigment precursor; and
baking the resulting pigment precursor, followed by grinding processing.

11. The process according to claim 10, wherein the coprecipitate is formed by controlling pH in a range from 11 to 13.5.

* * * * *